US008625612B2

(12) United States Patent
Cuervo et al.

(10) Patent No.: US 8,625,612 B2
(45) Date of Patent: Jan. 7, 2014

(54) MANAGEMENT OF SERVING GATEWAYS FOR ENHANCED PERFORMANCE

(75) Inventors: Fernando Cuervo, Dunrobin (CA); Allen Robinson, Ottawa (CA); Kevin Scott Cutler, Carp (CA)

(73) Assignee: Alcatel Lucent, Paris (FR)

( * ) Notice: Subject to any disclaimer, the term of this patent is extended or adjusted under 35 U.S.C. 154(b) by 385 days.

(21) Appl. No.: 12/826,014

(22) Filed: Jun. 29, 2010

(65) Prior Publication Data
US 2011/0317709 A1 Dec. 29, 2011

(51) Int. Cl.
*H04L 12/28* (2006.01)

(52) U.S. Cl.
USPC .......................................................... 370/401

(58) Field of Classification Search
None
See application file for complete search history.

(56) References Cited

U.S. PATENT DOCUMENTS

| | | | |
|---|---|---|---|
| 6,594,468 B1 | 7/2003 | Ramanathan | |
| 6,925,082 B2 * | 8/2005 | Buhrke et al. | 370/393 |
| 2007/0192495 A1 | 8/2007 | Marais et al. | |
| 2010/0080172 A1 | 4/2010 | Jin et al. | |
| 2010/0208698 A1 * | 8/2010 | Lu et al. | 370/331 |
| 2010/0215019 A1 * | 8/2010 | Velev et al. | 370/331 |
| 2012/0106508 A1 * | 5/2012 | Zhou et al. | 370/331 |

FOREIGN PATENT DOCUMENTS

| | | |
|---|---|---|
| WO | 2010048979 | 5/2010 |
| WO | 2010069601 A1 | 6/2010 |

OTHER PUBLICATIONS

ETSI TS 129 212, "Universal Mobile Telecommunications System (UMTS); LTE; Policy and Charging Control Over Gx Reference Point (3GPP TS 29.212 version 9.2.0 Release 9)", 2010.
ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.
ETSI TS 129 214, "Universal Mobile Telecommunications System (UMTS); LTE; Policy and Charging Control Over Rx Reference Point (3GPP TS 29,214 version 9.3.0 Release 9)", 2010.
International Search Report for PCT/IB2011/001783 dated Feb. 7, 2012.

* cited by examiner

*Primary Examiner* — Robert Wilson
*Assistant Examiner* — Ronald H Davis
(74) *Attorney, Agent, or Firm* — Kramer & Amado P.C.

(57) ABSTRACT

Various embodiments relate to a system and related method for managing a connection of a user device to a communications network. Various embodiments relate to a Policy and Charging Rules Node (PCRN) receiving a user requests through multiple serving gateways. The PCRN may assign one of the serving gateways as a primary serving gateway when the serving gateway sends a Gateway Control Session that binds to an IP-CAN session established in the PCRN. When the PCRN receives a subsequent message from another serving gateway, the PCRN may reassign the new serving gateway as primary when its Gateway Control Session matches. The PCRN may then mark the former serving gateway as pending termination and signal the marked gateway to terminate. After sending rules to serving gateways not pending termination, the PCRN may delete those serving gateways marked for termination.

22 Claims, 5 Drawing Sheets

MANAGEMENT OF SERVING GATEWAYS FOR ENHANCED PERFORMANCE

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed solely for voice communications has recently grown into a heterogeneous system that enables access to communications platforms such as text messaging, multimedia streaming along with general Internet access. To support such applications, service and infrastructure providers have built new networks over existing voice communication infrastructure. As evidenced by second and third generation networks, voice services must be carried over dedicated voice channels toward a traditional circuit-switched core, while other services, such as IP-enabled data and communications may be transmitted over a different packet-switched core, following Internet protocol (IP). This has led to unique problems, including, for example, application provision, metering and charging, and quality of experience (QoE) assurance.

One recent attempt to enhance the dual-core approach of the second (2G, 2.5G) and third generations (3G) of mobile telecommunications standards defined by the International Telecommunications Union has been in the form of a new set of standards. The Third Generation Partnership Project (3GPP) has recommended a new network scheme deemed 'Long Term Evolution' (LTE). Under the new standards, all communications in an LTE network are carried over an IP channel from user equipment (UE), such as a mobile phone or smartphone, to an all-IP core named the Evolved Packet Core (EPC). The EPC may then provide gateway access to other networks, while also ensuring an acceptable QoE for a user's network activity and properly charging the subscriber for such activity.

The 3GPP generally describes the components of the EPC and their interactions with each other in some technical specifications, specifically, 3GPP TS 29.212, 3GPP TS 29.213, and 3GPP TS 29.214, which describe components such as a Policy and Charging Rules Function (PCRF), Policy and Charging Enforcement Function (PCEF), and Bearer Binding and Event Reporting Function (BBERF) of the EPC. These technical specifications also provided some details regarding the interactions between these components. These specifications gave some guidance on how the EPC could provide reliable data services to users, while also reliably charging subscribers for use of the IP network.

For example, 3GPP TS 29.212, 3GPP TS 29.213, and 3GPP TS 29.214 provide some guidance on handling connectivity when multiple gateways may be used to connect a specific user device to the EPC. Specifically, the specifications provide some guidance on an algorithm to assign the user device to one of the candidate gateways. However, the algorithm outlined by the specifications may not always work and the specification does not consider such instances.

In view of the foregoing, it would be desirable to provide a system and method more capable of handling such occurrences. In particular, it would be desirable to provide a system that may take appropriate action when an algorithm to choose a specific gateway is unsuccessful.

SUMMARY

In light of the present need for a method for handling the designation of candidate gateways by the PCRN, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method performed by a Policy Charging and Rules Node (PCRN) to manage a connection of a user device to a communications network. The method includes one or more of the following steps, such as receiving a user request from the user device through at least a first serving gateway for connection to the communications network, generating a rule based on the information included in the user request received from the user device through the first serving gateway, pushing the rule to at least the first serving gateway, wherein the first serving gateway is not pending termination, and assigning the first serving gateway as the primary serving gateway. The method may also include receiving the user request from the user device through at least a second serving gateway for connection to the communications network, signaling the second serving gateway to terminate when the first serving gateway is assigned as the primary serving gateway, wherein the second serving gateway is signaled to remove the rule, and deleting the second serving gateway from a database in the PCRN when the second serving gateway does not respond to the signal to terminate.

Various embodiments may also relate to a system for handling a user device in a communications network. The system may include one or more of the following, such as a user device for establishing a connection with the communications network, the user device generating a user request for said establishing, a Packet Data Network Gateway (PGW) for generating an establishing message to establish an IP-CAN (Internet Protocol Connectivity Access Network) session, at least a first and second serving gateway for receiving the user request from the user device, the first serving gateway generating a first binding message and the second serving gateway generating the second binding message, and a Policy Charging and Rules Node (PCRN) for receiving at least the establishing message from the PGW and the first and second binding messages from the first and second gateways.

The PCRN of various embodiments receives the user request from the user device for connection to the communications network, generates a rule based on the information included in the user request received from the user device through the first binding message generated by the first serving gateway, pushes the rule to at least the first serving gateway, wherein the first serving gateway is not pending termination, assigns the first serving gateway as the primary serving gateway, signals the second serving gateway to terminate when the first serving gateway is assigned as the primary serving gateway, the second serving gateway signaled to remove the rule, and deletes the second serving gateway from a database in the PCRN when the second serving gateway does not respond to the signal to terminate.

It should be apparent that, in this manner, various exemplary embodiments enable dynamic handling of message from multiple sources. Particularly, by enabling the PCRN to control connections with multiple gateways, the PCRN may reduce processing load without sacrifice quality of service.

BRIEF DESCRIPTION OF THE DRAWINGS

In order to better understand various exemplary embodiments, reference is made to the accompanying drawings wherein.

DETAILED DESCRIPTION

Figure 1:
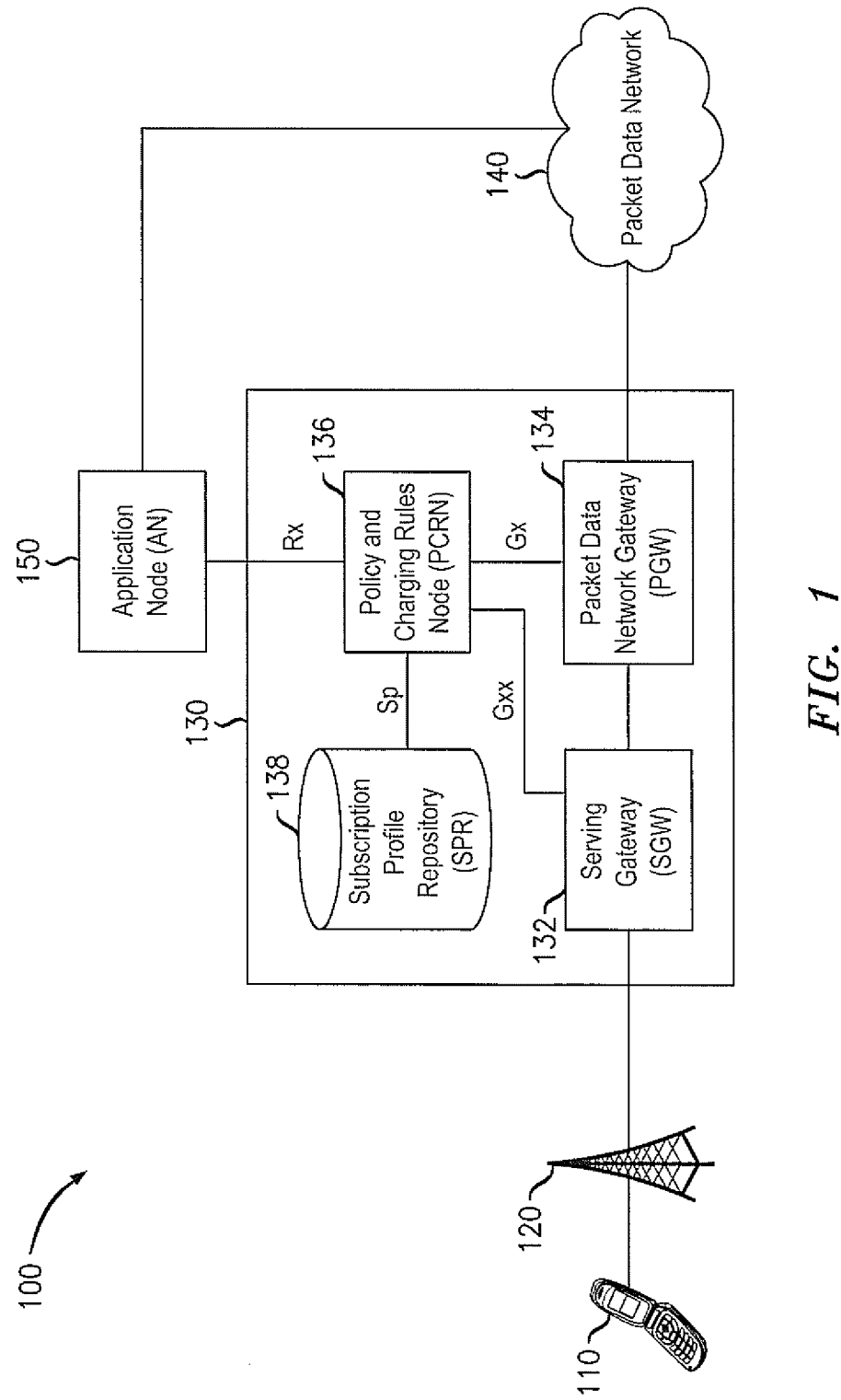
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include at least one piece of user equipment (UE) 110, a base station 120, an evolved packet core (EPC) 130, a packet data network 140, and an application node (AN) 150.

User equipment (UE) 110 may be a device that communicates with the packet data network 140 for providing the end-user with a data service. Such data service may include, for example, voice communication, text messaging, multimedia streaming, and Internet access. Specifically, in various exemplary embodiments, UE 110 is a personal or laptop computer, wireless e-mail device, cellular phone, television set-top box, or any other device capable of communicating with other devices via the EPC 130.

Base station 120 may be a device that enables communication between UE 110 and the EPC 130. For example, the base station 120 may be a base transceiver station such as an evolved nodeB (eNodeB) as defined by 3GPP standards. Thus, the base station 120 may be a device that communicates with the UE 110 via a first medium, such as radio communication, and communicates with the EPC 130 via a second medium, such as an Ethernet cable. Base station 120 may be in direct communication with the EPC 130 or may communicate via a number of intermediate nodes (not shown in FIG. 1). In various embodiments, multiple base stations (not shown) similar to the base station 120 may be present to provide mobility to the UE 110. In various alternative embodiments, UE 110 may communicate directly with the EPC 130. In such embodiments, the base station 120 may not be present.

Evolved packet core (EPC) 130 may be a device or network of devices that provides the UE 110 with gateway access to the packet data network 140. EPC 130 may further charge a subscriber for use of provided data services and ensure that particular quality of experience (QoE) standards are met. Thus, the EPC 130 may be implemented, at least in part, according to the 3GPP TS 29.212, 29.213, 29.214 technical specifications. Accordingly, the EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by the UE 110. SGW 132 may forward such packets towards the PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile Internet Protocol (PMIP) standard, the SGW 132 may include a Bearer Binding and Event Reporting Function (BBERF). In various exemplary embodiments, the EPC 140 may include multiple SGW (not shown) similar to the SGW 132 and each SGW may communicate with multiple base stations (not shown) similar to the base station 120.

Packet data network gateway (PGW) 134 may be a device that provides gateway access to the packet data network 140. PGW 134 may be the final device within the EPC 130 that receives packets sent by user equipment 110 toward the packet data network 140 via the SGW 132. PGW 134 may include a policy and charging enforcement function (PCEF) that enforces policy and charging control (FCC) rules for each service data flow (SDF). Thus, the PGW 134 may be a policy and charging enforcement node (PCEN). PGW 134 may include a number of additional features, such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with application node (AN) 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

PCRN 136 may receive messages from SGW 132 and PGW 134. These messages may both, for example, originate as a single request from the UE 110. For example, the UE 110 may generate a service request that requires both access to the EPC 130 and the PGW 134. PCRN 136 may create sessions for messages received through the SGW 132 and PGW 134 and may also bind these sessions together when the messages are related to each other. PCRN 136 may then ensure proper service for the UE 110 when, fo example, the UE 110 moves and communicates with a new SGW (not shown). The PCRN 136 may regulate the binding of newly-established session from the new SGW so that the UE 110 still has access to the packet data network through the PGW 134, while ensuring a binding between the session (e.g., IP-CAN session) through PGW 134 and various other sessions (e.g., gateway control sessions) through various SGWs 132.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. In other embodiments, the SPR 138 may be a device separate from the EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
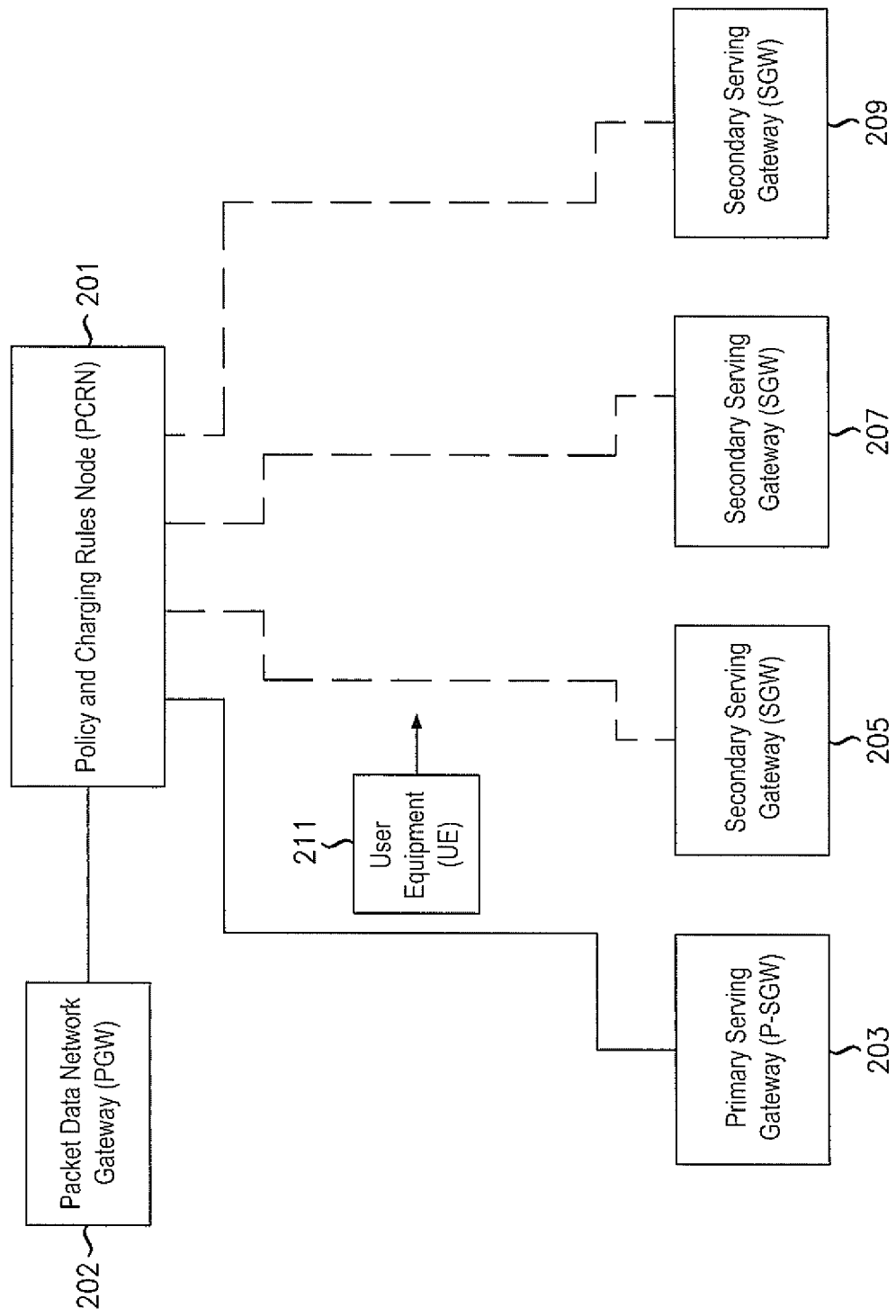
FIG. 2 illustrates an exemplary network for a PCRN to receive multiple requests from a plurality of serving gateways.

FIG. 2 illustrates an exemplary network for a PCRN to receive multiple requests from a plurality of serving gateways. The exemplary network 200 may include components of the EPC 130, including a policy and charging rules node (PCRN) 201 a packet data network gateway (PGW) 202, a plurality of serving gateways 203-209 and at least one piece of user equipment (UE) 211. The plurality of serving gateways 203-209 may include a primary serving gateway (P-SGW) 203 and a plurality of secondary serving gateways (SGW) 205-209.

The PCRN 201 may be similar to PCRN 136 of network 100. The PCRN 201 may receive multiple requests from the plurality of serving gateways 203-209. In various embodiments, the requests from the serving gateways 2032-209 may be generated in response to a user request generated by UE 211. When multiple gateways 203-209 are capable of enabling connectivity for the UE 211, the PCRN 201 may designate one serving gateway from the plurality of serving gateways 203-209 to serve as the primary serving gateway (P-SGW) 203. PCRN 201 may also designate the other candidate serving gateways as non-primary serving gateways (SGW) 205-209.

PCRN 201 may base the assignment of the primary serving gateway on the best match with an established IP-CAN session within the PCRN 201 according to various attributes. Such attributes may be included in a Session Binding Identifier (SBI) that was created and subsequently stored when the IP-CAN session was established. Other attributes may include, for example, a matching IP-CAN Type. Various embodiments may involve the PCRN 201 using other methods to determine the primary gateway using various criteria associated with each respective serving gateway 203-209 such as, for example, distance to the UE 211 and/or PCRN 201, propagation time, time shift, available capacity, and device load, among others.

Primary serving gateway (P-SGW) 203 may be assigned as the primary serving gateway by the PCRN 201 after transmitting a request to the PCRN 201. P-SGW 203 may generate a request in response to a received user request sent by UE 211. The request generated by P-SGW 203 may be a Gateway Control Session Establishment Request. The PCRN 201 may match the request transmitted by the P-SGW 203 to an established IP-CAN session stored in the PCRN 201. The IP-CAN session may be associated with a connection to a packet data network gateway (PGW) 202, similar to the PGW 134 in system 100.

Over time, the User Equipment (UE) 211 may change locations. In some embodiments, the UE 211 may change locations while connected to the network. In these instances, multiple serving gateways 203-209, which may include the primary serving gateway (P-SGW) 203 and at least one secondary serving gateway (SGW) 205-209, may attempt to enable UE 211 connectivity to the network through PCRN 201. In some embodiments, PCRN 201 may not initially determine which one of the candidate gateways 203-209 should act as the primary serving gateway. This may occur when the PCRN 201 uses an algorithm to determine a primary serving gateway (i.e., P-SGW 203), but does not produce an actual gateway from the candidate gateways 203-209 to serve as the primary.

In some instances, multiple serving gateways 205-209 may attempt connectivity with the PCRN 201 for the UE 211 as non-primary or backup serving gateways. While the PCRN 201 may allow connectivity through non-primary gateways, simultaneous connection to a high number of redundant non-primary serving gateways may place a strain on the PCRN 201 and cause a loss in the PCRN's 201 processing speed. In some embodiments, the build-up of extraneous SGWs 205-209 may be the result of an SGW 205 failing to report to the PCRN 201, which may maintain the gateway control session established in SGW 205 while also establishing a new gateway control session in SGW 207.

In some embodiments, the PCRN 201 may avoid the problem of extraneous serving gateways 205-209 due to handovers through exclusion, where the PCRN 201 only pushes PCC rules and QoS rules to SGWs 205-209 that are not pending termination. After the handover of the primary serving gateway takes place, for example from the SGW 203 to the SGW 205, the PCRN 201 may force the other serving gateways 203, 207, 209 to terminate any potential gateway control sessions generated to handle the UE 211. The serving gateways 203, 207, 209 may mark their respective gateway control sessions as pending termination, so that the serving gateways 203, 207, 209 no longer receive further rules from the PCRN 201. The serving gateways 203, 207, 209 may respond to the request made by the PCRN 201 by terminating the generated sessions associated with the UE 211. However, if the serving gateways 203, 207, 209 fail to respond to the request by the PCRN 201, the PCRN may delete records of the serving gateways 203, 207, 209 from its database so that it ignores any requests received through those serving gateways 203, 207, 209.

Figure 3:
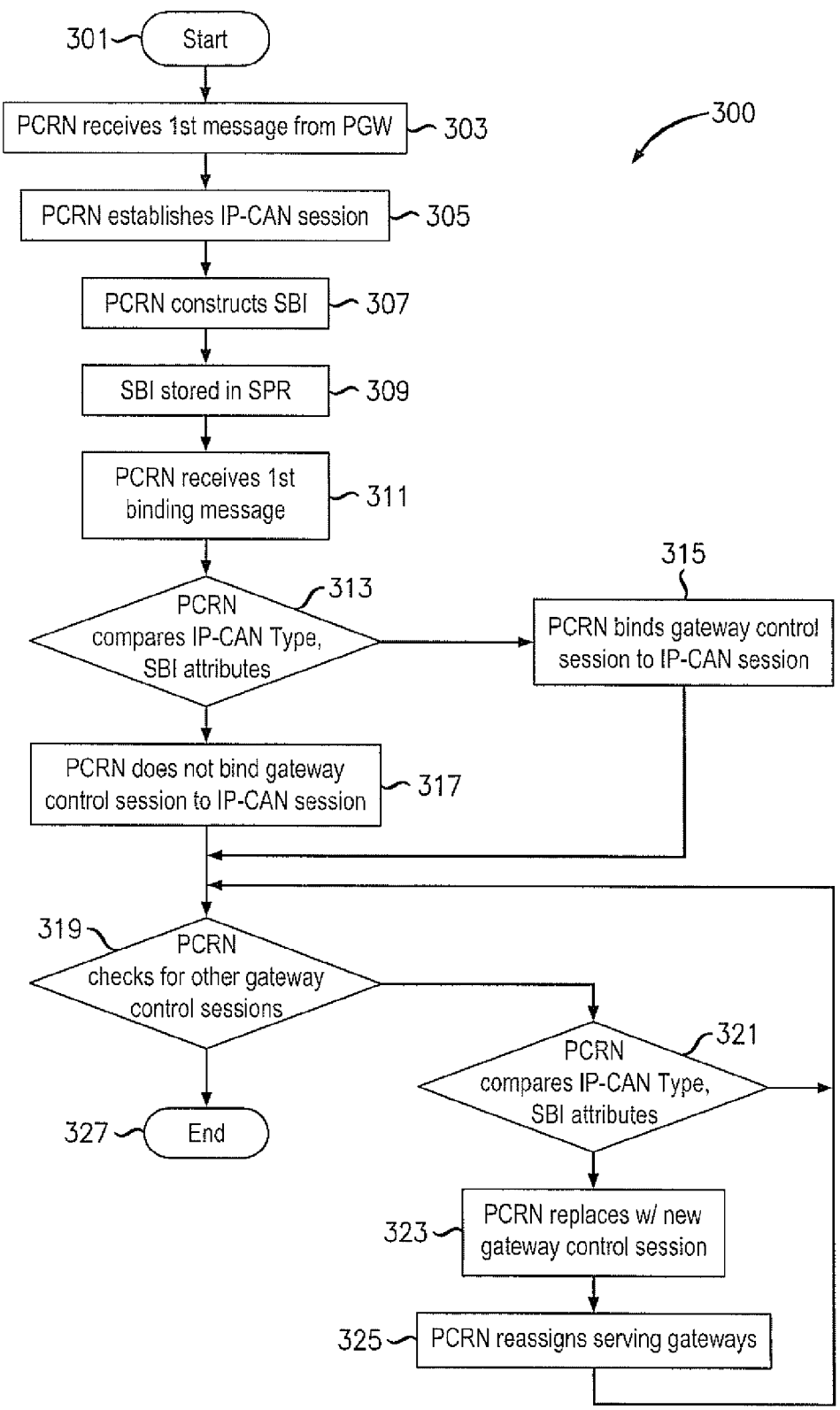
FIG. 3, illustrates an exemplary flowchart for binding an established IP-CAN session to a target gateway control session.

Referring now to FIG. 3, an exemplary flowchart for binding an established IP-CAN session to a target gateway control session is illustrated. In steps 301-303, the PCRN 201 may receive a message from the PGW 202 that may include information to establish an IP-CAN session at the PCRN 201. The establishing message sent by the PGW 202 may also include information that the PCRN 201 may also use to construct a Session Binding Identifier (SBI). The information used to construct the SBI may be, for example, a message's session identification, IPv4 address, IPv6 prefix, at least one subscription identifier, and Access Point Name (APN). In step 305, the PCRN 201 may establish the IP-CAN session in the PCRN 201. The PCRN 201 may then in step 307 construct an SBI for the IP-CAN session using the information included in the establishing message. In some embodiments, the message may not include all possible attributes that may be included in the SBI. For example, PGW 202 may send an establishing message for an IP-CAN session that only includes information regarding the IPv4 address and IPv6 prefix. The PCRN 201 may construct an SBI using the information available. If there is no existing SBI matching the SBI constructed for the IP-CAN session, the PCRN 201 may then in step 309 store the newly-constructed SBI in SPR 138 via the Sp interface.

In step 311, the PCRN 201 may receive a first binding message from one of the serving gateways 203-209. In some embodiments, the PCRN 201 might attempt to appoint a primary serving gateway. The PCRN 201 may determine whether to assign the serving gateway 203 that sent the first binding message as the primary serving gateway, for example, by determining whether the gateway control session contained in the first binding message matches the established IP-CAN session. This may include, for example, comparing in step 313 the IP-CAN Type included in the message with the established IP-CAN session. In some embodiments, the IP-CAN Type must match the IP-CAN session in order for the gateway control session to bind with the established IP-CAN session.

In some embodiments, the PCRN 201 may also construct an SBI from the information included in the binding message and compare the SBI of the binding message with the SBI of the establishing message. The comparison of the IP-CAN session's SBI with the gateway control session's SBI in step 313 may involve the PCRN 201 first determining if a respective SBI contains an attribute value, such as, for example, an IPv6 prefix. The PCRN 201 may then use the attributes included in the gateway control session's SBI and compare those attributes with that of the IP-CAN session's SBI to determine if they both refer to the same subscriber. When making such a comparison, all available attributes must match (i.e., the IPv4 address and the IPv6 prefix must match, the subscription IDs must refer to the same subscriber, etc.) in order for the gateway control session to bind with the IP-CAN session.

If the potential gateway control session SBI matches with the SBI of the established IP-CAN session, the PCRN 201 may in step 315 bind the potential gateway control session to the established IP-CAN session, while the PCRN 201 may store a record of the binding in a database. Otherwise, when the IP-CAN Type or an SBI attribute fails to match (e.g., the SBIs do not refer to the same subscriber), the method 300 may proceed to step 317, where the potential gateway control session remains unbound from the established IP-CAN session. In some embodiments, the PCRN may also mark the serving gateway that transmitted the message as ready for termination. For example, if SGW 205 sends a gateway control message that does not match the IP-CAN session established in the PCRN 201 for the UE 211, the PCRN 201 may mark the gateway control session in SGW 205 as ready for termination. In some embodiments, the PCRN 201 may terminate the session through a Re-Authorization Request (RAR), such as a session-abort-cause attribute-value pair (AVP). In some embodiments, the PCRN 201 may signal the SGW 205 to terminate the session through a message, such as a Command-Code Request (CCR) message. In other embodiments, the PCRN 201 may kill the session if it was established in the PCRN 201.

Following either step 315 or 317, in step 319, the PCRN 201 may determine whether there are other potential gateway control sessions that may bind to the IP-CAN session. In some embodiments, the PCRN 201 may wait for a pre-determined period before checking for other gateway control sessions. In other embodiments, the PCRN 201 may wait until it receives a subsequent binding message from a second serving gateway while the first gateway control session remains bound to the IP-CAN session.

When there is a subsequent potential gateway control session, the PCRN in step 321 may compare the IP-CAN Type and SBI attributes of the subsequent potential gateway control session with the established IP-CAN session, with step 321 being similar to step 313. If the IP-CAN Type and available SBI attributes match the established IP-CAN session, the PCRN in step 323 bind the subsequent potential gateway control session with the IP-CAN session. In some embodiments, the PCRN 201 may also unbind the previous gateway control session from the IP-CAN session. In these embodiments, the PCRN 201 may also delete the previously bound gateway control session in the PCRN 201 and/or the serving gateway. The PCRN 201 may signal the serving gateway to delete the gateway control session through a Re-Authorization Request (RAR), which may be, for example, a session-abort-cause AVP. The serving gateway may subsequently remove the gateway control session.

In step 325, the PCRN 201 may reassign the serving gateway that transmitted the message containing the subsequent potential gateway control session as the primary serving gateway. In some embodiments, the PCRN 201 may reassign the former primary serving as a non-primary serving gateway. In other embodiments, the PCRN 201 may mark the former primary serving gateway as pending termination. The PCRN 201 may mark the serving gateway through a Re-Authorization Request (RAR), which may be, for example, a session-abort-cause AVP.

After step 325, method 300 may return back to step 319, where the PCRN 201 may wait to receive another gateway control session. Alternatively, method 300 may return back to step 325 when, at step 321, the PCRN 201 determines upon comparison of the IP-CAN Type and SBI attributes of the subsequent potential gateway control session against the IP-CAN session, the subsequent potential gateway control session did not match. At step 319, when the PCRN 201 determines that there are no longer any subsequent potential gateway sessions to bind with the IP-CAN session, the PCRN 201 may proceed to step 327, ending method 300.

As an example, a P-SGW 203 may serve as a primary serving gateway after the PCRN 201 bound an established IP-CAN session for UE 211 with a first gateway control session (GCS1), which was included in a first binding message sent by the P-SGW 203. The PCRN 201, after determining that the GCS1 matched the IP-CAN session, may have assigned the P-SGW 203 as the primary service gateway. After this establishment, the UE 211 may move, or other events known to a person of skill in the art may cause a second serving gateway SGW 207 to also transmit a second binding message from UE 211 to the PCRN 201. The second binding message may also include a second gateway control session (GCS2) that may be a subsequent potential gateway control session. The PCRN 201 may have taken no action between the binding of the GCS1 with the IP-CAN session and the receipt of the GCS2. The PCRN 201 may have also waited for a pre-determined time to receive a message from the SGW 207.

Upon receipt of the GCS2, the PCRN 201 may determine that the GCS2 also matches the IP-CAN Type and SBI of the IP-CAN session. When the GCS2 matches, the PCRN 201 may bind the GCS2 to the IP-CAN session. The PCRN 201 may also substitute the SGW 203 with SGW 207 as the primary serving gateway, as the SGW 207 transmitted the second binding message. In some embodiments, the PCRN 201 may keep the GCS1 bound to the IP-CAN session as non-primary. In other embodiments, the PCRN 201 may unbind the GCS1 from the IP-CAN session once the latter GCS2 binds to the IP-CAN session and is assigned as primary. In some embodiments, the PCRN 201 may delete the GCS1 in the PCRN 201 and/or SGW 203. In some embodiments, the PCRN 201 may mark the SGW 203 as pending termination.

Figure 4:
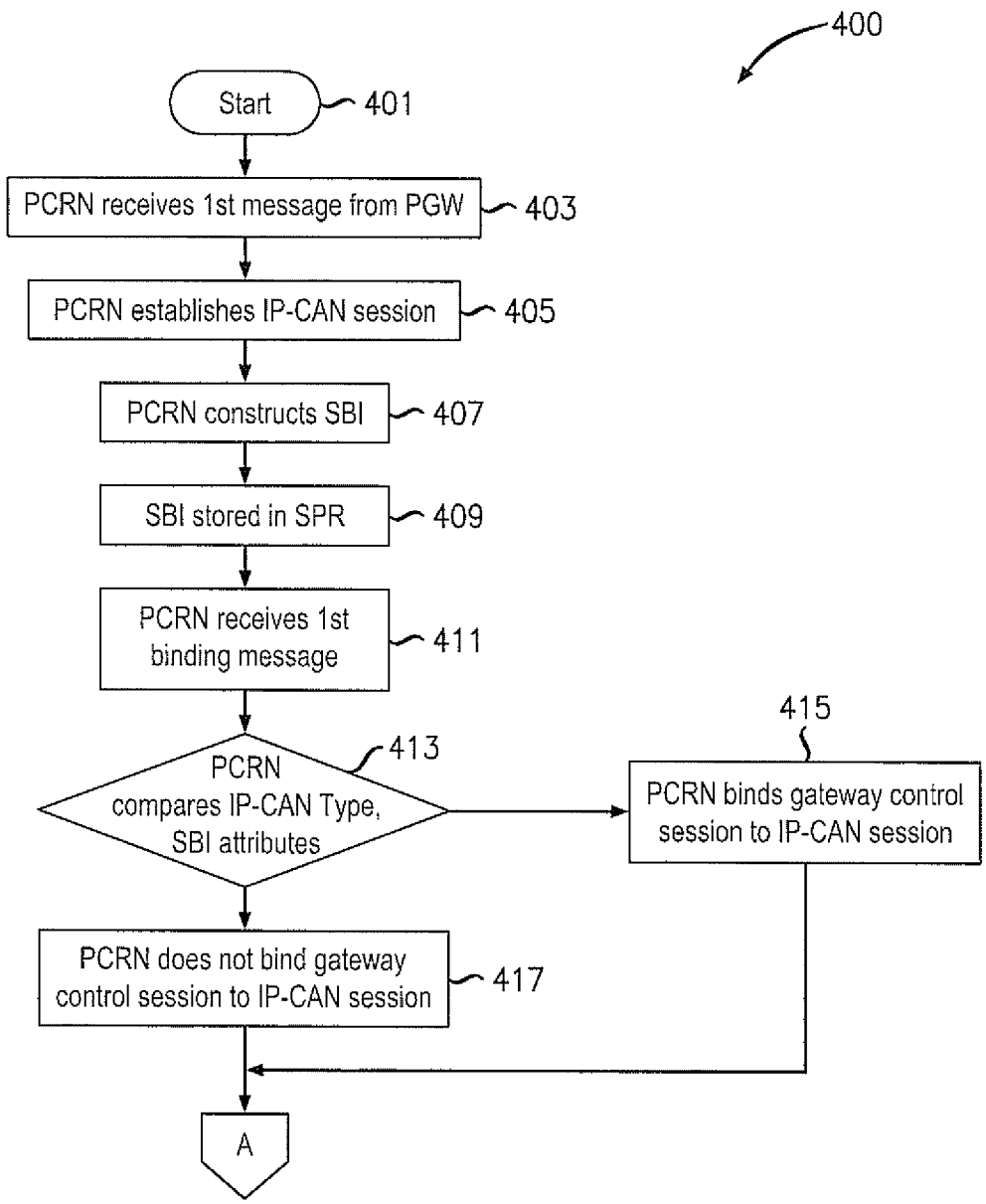
FIG. 4, illustrates another exemplary flowchart for binding an established IP-CAN session to a target gateway control session.
Figure 4:
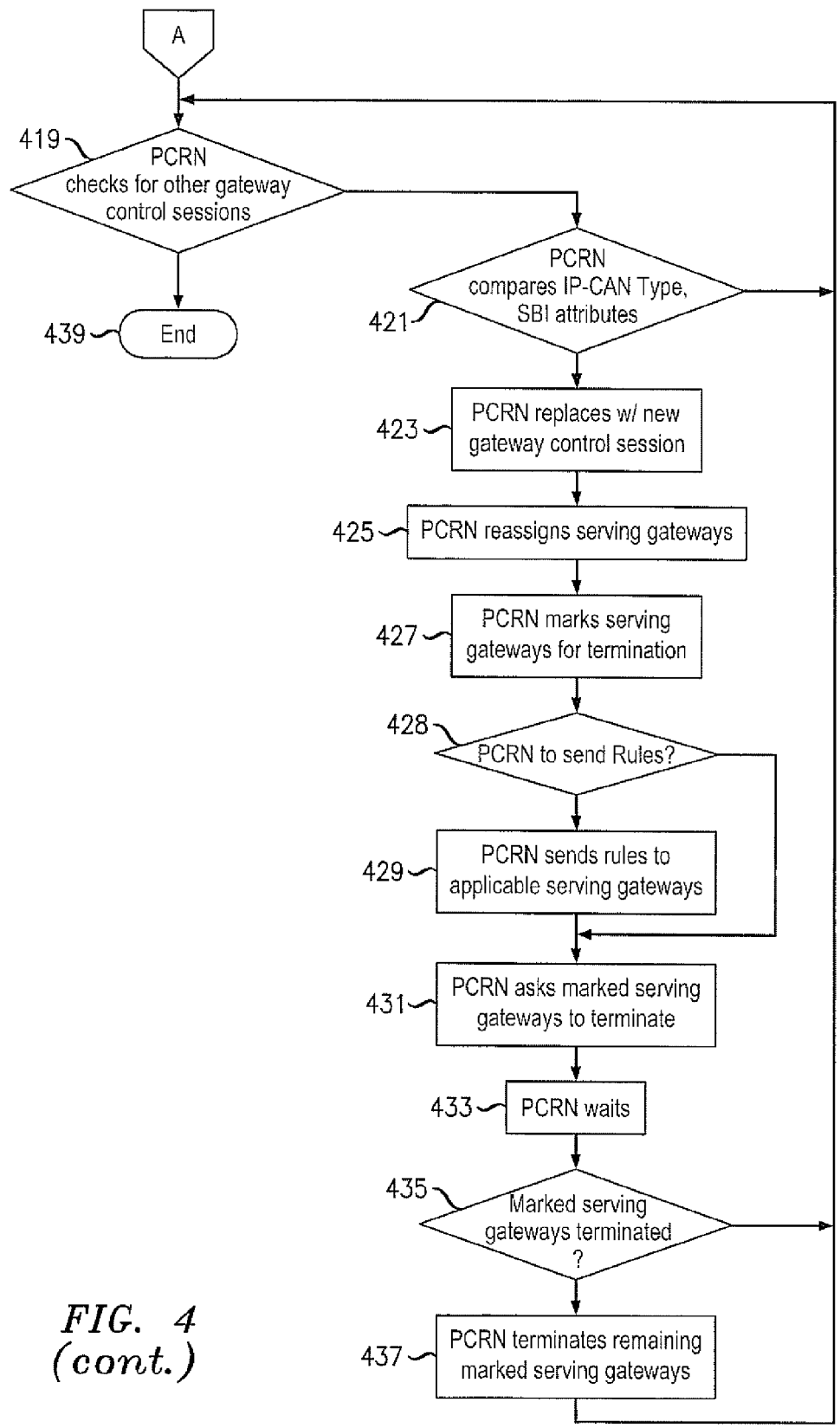

Referring now to FIG. 4, another exemplary flowchart for binding an established IP-CAN session to a target gateway control session is illustrated. Method 400 in FIG. 4 may be similar to method 300 in FIG. 3, with the PCRN 201 in method 400 pushing messages to all relevant serving gateways that are not marked for termination. This may still allow the PCRN 201 to support a limited number of non-primary serving gateways without overly limiting processing speed, as the systematic marking of serving gateways for termination may limit the number of serving gateways connected for a given UE 211.

Steps 401-423 are similar to 301-323, with the PCRN 201 receiving an establishing message from PGW 202 containing an IP-CAN session, the PCRN 201 establishing the IP-CAN session, constructing an SBI from information included in the establishing message, and storing the SBI in the SPR 138. At step 411, the PCRN 201 may receive one or more binding messages simultaneously. In either instance, the PCRN in step 413 may compare of the potential gateway control sessions with the IP-CAN session, comparing, for example, the IP-CAN Type and available SBI attributes with the IP-CAN session and its SBI. If it matches, the PCRN 201 may bind the gateway control session to the IP-CAN session in step 415. If the gateway control session does not match, the PCRN 201 may proceed to step 417, where the sessions remain unbound. The PCRN 201 may wait to receive another message containing a gateway control session in step 419.

When there is another gateway control session, the PCRN may in step 421 compare the subsequent potential gateway control session to the IP-CAN session. If the subsequent gateway control session matches, in step 423, the IP-CAN session may bind the subsequent potential gateway control session with the IP-CAN session. In some embodiments, the PCRN 201 may unbind the previous gateway control session and mark the session for removal in the PCRN 201 and the serving gateway. The PCRN 201 may mark the gateway control session for termination in the PRCN 201 and/or serving gateway through a Re-Authorization Request (RAR), which may be, for example, a session-abort-cause AVP.

In step 425, the PCRN 201 may reassign the serving gateway that sent the message containing the subsequent potential gateway control session, now bound to the IP-CAN session, as the primary gateway control session. The PCRN 201 in step 427 may then reassign the previous primary serving gateway that sent the message containing the previously-bound gateway control session. In some embodiments, the PCRN 201 may mark the previous serving gateway as a non-primary serving gateway, where the previous gateway control session may still be bound to the IP-CAN session as non-primary. In some embodiments, the PCRN 201 may mark previous gateways as pending termination. In some embodiments, the PCRN 201 may only mark the previous primary serving gateway as pending termination. In other embodiments, the PCRN 201 may mark one or more serving gateways as pending termination, up to an including the previous primary termination. The PCRN 201 may not, however, in step 427 mark the current primary serving gateway as pending termination.

In step 428, the PCRN 201 may determine whether to send a rule to the applicable gateways. If the PCRN 201 decides to send a rule, the PCRN 201 may proceed to step 429; otherwise, the PCRN 201 may proceed to step 431. In step 429, the PCRN 201 may send a rule to all serving gateways not pending termination. The PCRN 201 may send, for example, a Quality-of-Service (QoS) rule or a Policy Charging and Control (PCC) rule. The PCRN 201 may therefore exclude all serving gateways marked as pending termination from receiving the transmitted rule. The PCRN 201 in step 431 may then ask the serving gateways marked as pending termination to terminate. The PCRN 201 may send the request in the form of an RAR or CCR that contains a session-abort-cause AVP.

In step 433, the PCRN 201 may wait for the serving gateways to terminate. In some embodiments, the PCRN 201 may wait for an indeterminate time or until a trigger event occurs for the marked serving gateways to terminate. A person of ordinary skill in the art would be aware of trigger events that would cause a reaction by the PCRN 201. In some embodiments, the PCRN 201 may wait for a pre-determined period before checking the marked serving gateways. In step 435, the PCRN 201 may check whether the serving gateways were actually terminated. If not, the PCRN 201 may in step 437 delete the marked serving gateways from the database. Such manual action by the PCRN 201 may prevent a hanging condition.

After step 437 or if in step 435, the PCRN 201 determines that all the marked serving gateways were in fact deleted, the method 400 may return to step 419 to check for other subsequent potential gateways. Similarly, if in step 421, the PCRN 201 determines that the subsequent gateway control session did not match the IP-CAN session, the PCRN 201 may return to step 419 to check for other subsequent gateway control sessions. When the PCRN 201 in step 419 determines that there are no other subsequent potential gateway control sessions, method 400 ends at step 439.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method performed by a Policy Charging and Rules Node (PCRN) to manage a connection of a user device to a communications network, the method comprising:
   receiving a user request from the user device through a first serving gateway for connection to the communications network;
   receiving the user request from the user device through at least a second serving gateway for connection to the communications network;
   generating a rule based on the information included in the user request received from the user device through the first serving gateway;
   assigning the first serving gateway as a primary serving gateway; and signaling the second serving gateway to terminate at least one session associated with the user device when the first serving gateway is assigned as the primary serving gateway.

2. The method of claim 1, wherein the first serving gateway comprises a serving gateway with a Gateway Control Session that matches an Internet Protocol Connectivity Access Network (IP-CAN) session established in the PCRN.

3. The method of claim 2, wherein the Gateway Control Session matches the IP-CAN session when a session binding identifier (SBI) included in a received binding message containing the Gateway Control Session and an SBI included in a received establishing message containing the IP-CAN session are associated with a common subscriber.

4. The method of claim 3, wherein the SBI of the Gateway Control Session and the SBI of the IP-CAN session are comprised of a set of attributes, the attributes including at least one of:
   a session identification;
   an Ipv4 address;
   an Ipv6 address;
   an Access Point Name (APN); and
   at least one subscriber identifier (SID);
   wherein the attributes comprising the SBI of the Gateway Control Session and the SBI of the IP-CAN session also comprise attributes in at least one subscriber profile.

5. The method of claim 2, wherein the Gateway Control Session matches the IP-CAN session when an IP-CAN Type included in a received binding message containing the Gateway Control Session matches the IP-CAN session.

6. The method of claim 1, further comprising:
   pushing the rule to at least the first serving gateway, when the first serving gateway is not pending termination.

7. The method of claim 6 wherein the first and second serving gateways are connected to nodes configured to receive communications from the user device after a handover from a third serving gateway.

8. The method of claim 7, wherein the PCRN receives the user request from the user device through the third serving gateway.

9. The method of claim 8, further comprising:
   reassigning the third serving gateway from the primary serving gateway to a secondary serving gateway after pushing the rule to at least the first and third serving gateways.

10. The method of claim 1, further comprising:
    waiting for a response from the second serving gateway for a pre-determined period after the signaling to the second gateway to terminate at least one session associated with the user device.

11. The method of claim 1, wherein the signaling of the second gateway to terminate at least one session associated with the user device further comprises:
    sending a session-abort-cause Attribute-Value Pair (AVP) in response to assigning the first serving gateway as the primary serving gateway.

12. The method of claim 1, further comprising:
    deleting the second serving gateway from a database in the PCRN when the second serving gateway does not respond to the signal to terminate at least one session associated with the user device.

13. A system for handling a user device in a communications network, the system comprising:
    at least a first and second serving gateway that receive a user request generated from the user device for establishing a connection with the communications network, the first serving gateway generating a first binding message and the second serving gateway generating a second binding message;
    a Packet Data Network Gateway (PGW) that generates an establishing message to establish an Internet Protocol Connectivity Access Network (IP-CAN) session; and
    a Policy Charging and Rules Node (PCRN) that receives at least the establishing message from the PGW and the first and second binding messages from the first and second gateways, wherein the PCRN:
        receives the user request from the user device through the first serving gateway for connection to the communications network;
        generates a rule based on the information included in the user request received from the user device through the first binding message generated by the first serving gateway;
        assigns the first serving gateway as a primary serving gateway; and
    signals the second serving gateway to terminate at least one session associated with the user device when the first serving gateway is assigned as the primary serving gateway.

14. The system of claim 13, wherein the first serving gateway comprises a serving gateway with a Gateway Control Session that matches an IP-CAN session established in the PCRN.

15. The system of claim 14, wherein the Gateway Control Session matches the IP-CAN session when an IP-CAN Type included in the first binding message containing the Gateway Control Session matches the IP-CAN session.

16. The system of claim 13, wherein the PCRN deletes the second serving gateway from a database in the PCRN when the second serving gateway does not respond to the signal to terminate the at least one session associated with the user device.

17. The system of claim 13, wherein the PCRN further:
pushes the rule to at least the first serving gateway, wherein the first serving gateway is not pending termination.

18. The system of claim 17, wherein the first and second serving gateways are connected to nodes configured to receive communications from the user device after a handover from a third server gateway.

19. The system of claim 18, wherein the PCRN receives the user request from the user device through the third server gateway.

20. The system of claim 19, wherein the PCRN reassigns the third serving gateway from the primary serving gateway to a secondary serving gateway after pushing the rule to at least the first and third serving gateways.

21. The system of claim 13, wherein the PCRN waits for a response from the second serving gateway for a pre-determined period after the signaling to the second gateway to terminate at least one session associated with the user device.

22. The system of claim 13, wherein the PCRN signaling of the second gateway to terminate at least one session associated with the user device comprises sending a session-abort-cause Attribute-Value Pair (AVP) in response to assigning the first serving gateway as the primary serving gateway.

\* \* \* \* \*